United States Patent
Pfister et al.

(10) Patent No.: US 9,895,842 B2
(45) Date of Patent: Feb. 20, 2018

(54) SELECTIVE SINTERING OF STRUCTURALLY MODIFIED POLYMERS

(75) Inventors: Andreas Pfister, Munich (DE); Frank Mueller, Fuerstenfeldbruck (DE); Martin Leuterer, Olching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 12/454,472

(22) Filed: May 18, 2009

(65) Prior Publication Data

US 2009/0295042 A1 Dec. 3, 2009

Related U.S. Application Data

(60) Provisional application No. 61/188,962, filed on Aug. 14, 2008, provisional application No. 61/188,987, filed on Aug. 14, 2008.

(30) Foreign Application Priority Data

May 20, 2008 (DE) .................. 10 2008 024 281
May 20, 2008 (DE) .................. 10 2008 024 288

(51) Int. Cl.
| | |
|---|---|
| B29C 67/00 | (2017.01) |
| B33Y 70/00 | (2015.01) |
| C08J 3/28 | (2006.01) |
| C08L 77/06 | (2006.01) |
| B29C 35/08 | (2006.01) |
| B29K 71/00 | (2006.01) |

(52) U.S. Cl.
CPC .......... *B29C 67/0077* (2013.01); *B33Y 70/00* (2014.12); *C08J 3/28* (2013.01); *C08L 77/06* (2013.01); *B29C 2035/0838* (2013.01); *B29K 2071/00* (2013.01)

(58) Field of Classification Search
CPC ................................................. B29C 67/0077
USPC ....................................................... 264/497
See application file for complete search history.

(56) References Cited

U.S. PATENT DOCUMENTS

| | | | |
|---|---|---|---|
| 3,516,966 A | 6/1970 | Berr | |
| 3,549,601 A | 12/1970 | Fowell | |
| 4,863,538 A | 9/1989 | Deckard | |
| 5,429,908 A | 7/1995 | Hokuf et al. | |
| 5,658,412 A | 8/1997 | Retallick et al. | |
| 6,136,948 A | 10/2000 | Dickens, Jr. et al. | |
| 6,932,935 B1 | 8/2005 | Oberhofer et al. | |
| 2004/0102539 A1 | 5/2004 | Monsheimer et al. | |
| 2005/0116391 A1 | 6/2005 | Lindemann et al. | |
| 2006/0071359 A1 | 4/2006 | Monsheimer et al. | |
| 2006/0134419 A1* | 6/2006 | Monsheimer ....... | B29C 67/0077 428/402 |
| 2006/0251878 A1 | 11/2006 | Meakin et al. | |
| 2007/0126159 A1 | 6/2007 | Simon et al. | |
| 2007/0197692 A1 | 8/2007 | Monsheimer et al. | |
| 2007/0260349 A1 | 11/2007 | John et al. | |
| 2008/0138454 A1 | 6/2008 | Perret et al. | |
| 2008/0152910 A1 | 6/2008 | Hesse et al. | |
| 2008/0228498 A1 | 9/2008 | Gasque | |
| 2008/0258330 A1 | 10/2008 | Muller et al. | |
| 2009/0017220 A1 | 1/2009 | Muller et al. | |
| 2011/0052927 A1* | 3/2011 | Martinoni et al. ......... | 428/474.7 |

FOREIGN PATENT DOCUMENTS

| | | |
|---|---|---|
| CN | 1155258 | 7/1997 |
| DE | 1 942 452 | 4/1970 |
| DE | 44 10 046 | 5/1995 |
| DE | 101 29 305 | 12/2002 |
| DE | 10 2007 024 469 | 11/2008 |
| EP | 1 413 594 | 4/2004 |
| EP | 1 674 497 | 6/2006 |
| EP | 1 787 789 | 5/2007 |
| EP | 1849586 A1 | 10/2007 |
| EP | 1 925 435 | 5/2008 |

(Continued)

OTHER PUBLICATIONS

DIN-EN ISO 1183-1, Plastics "Methods for determining the density of non-cellular plastics" Part 1: Immersion method, liquid pyknometer method and titration method (ISO 1183-1 : 2004) English version of DIN EN ISO 1183-1, 2004.
ISO 527-2, Plastics—Determination of tensile properties—Part 2: "Test conditions for moulding and extrusion plastics", Jun. 15, 1993.
RÖMPP Online, version 3.10, "Molecular mass distribution", Document identifier RD-13-02945, http:/www.roempp.com.
RÖMPP Online, version 3.10, "Molecular mass distribution", Document identifier RD-13-02945, http:/www.roempp.com (English translation).
Legrass et al., "Extension of the concept of chemical nucleation to poly(ether ketones)", Polymer, 1990, vol. 31, Aug. 1990, pp. 1429-1434.
Cowie, "Polymers: Chemistry & Physics of modern materials", $2^{nd}$. Edition, p. 236.

(Continued)

*Primary Examiner* — Larry Thrower
(74) *Attorney, Agent, or Firm* — Locke Lord LLP; Scott D. Wofsy; Nicholas J. Diceglie, Jr.

(57) ABSTRACT

A three-dimensional object is manufactured by selective sintering by means of electromagnetic radiation, wherein the powder comprises a polymer or copolymer having at least one of the following structural characteristics:
  (i) at least one branching group in the backbone chain of the polymer or copolymer, provided that in case of the use of polyaryletherketones (PAEK) the branching group is an aromatic structural unit in the backbone chain of the polymer or copolymer;
  (ii) modification of at least one end group of the backbone chain of the polymer or copolymer;
  (iii) at least one bulky group within the backbone chain of the polymer of copolymer, provided that in case of the use of polyaryletherketones (PAEK) the bulky group is not selected from the group consisting of phenylene, biphenylene, naphthalene and $CH_2$— or isopropylidene-linked aromatics;
  (iv) at least one aromatic group non-linearly linking the backbone chain.

15 Claims, 1 Drawing Sheet

(56) References Cited

FOREIGN PATENT DOCUMENTS

| | | |
|---|---|---|
| EP | 2106337 A2 | 10/2009 |
| EP | 2115043 A2 | 11/2009 |
| JP | H0641295 A | 2/1994 |
| JP | 7-501765 | 2/1995 |
| JP | 2003-506229 | 2/2003 |
| JP | 2003335816 A | 11/2003 |
| JP | 2005-089863 | 4/2005 |
| JP | 2006225664 A | 8/2006 |
| JP | 2007-523774 | 8/2007 |
| JP | 2007217651 A | 8/2007 |
| JP | 2007277546 A | 10/2007 |
| JP | 2007303601 A | 11/2007 |
| JP | 2007535585 A | 12/2007 |
| RU | 2 145 269 | 2/2000 |
| WO | WO-2004/058487 | 7/2004 |
| WO | WO-2005/097475 | 10/2005 |
| WO | WO-2008/057844 | 5/2008 |
| WO | 2008/122426 A2 | 10/2008 |
| WO | 2008/145316 A2 | 12/2008 |
| WO | WO-2009/114715 | 9/2009 |

OTHER PUBLICATIONS

Decision on Grant of Patent for Invention dated Jun. 14, 2013 in corresponding Russian Patent Application No. 2009118968/05(026103).
Verification of Translation of International Application No. PCT/EP95/03078.
Notification of the First Office Action, issued in corresponding Chinese Patent Application No. CN 201410850625.7, dated Jun. 12, 2016.
Japanese Office Action dated Jun. 8, 2016, and English translation thereof, issued during the prosecution of corresponding Japanese Patent Application No. 2015-133510.
Japanese Office Action issued by the Japanese Patent Office dated Apr. 5, 2017, in corresponding Japanese Patent Application No. 2015-133510.
Communication of a Notice of Opposition issued in corresponding European Patent Application No. 10175677.3, dated Nov. 23, 2017.
Shi et al., Effect of the properties of the polymer materials on the quality of selective laser sintering parts, Proc. IMechE., 218, Part L: J. Materials: Design and Applications, pp. 247-252.
Gardner et al., Structure, crystallization and morphology of poly(aryl ether ketone ketone), Polymer, 33(12), 1992, pp. 2483-2495.
Chang and Hsiao, Thermal Properties of High Performance Thermoplastic Composites Based on Poly(Ether Ketone Ketone) (PEKK), 36th International SAMPE Symposium, Apr. 15-18, 1991, pp. 1587-1601.
Tan et al., Scaffold development using selective laser sintering of polyetherketone-hydroxyapatite biocomposite blends, Biomaterials, 24, 2003, pp. 3115-3123.
Hsiao and Chang, Thermal behavior of high-performance poly(aryl ether ketone ketone (PEKK), Polymer Reprints Am.Chem.Soc., Div. Polymer Chem.), 32(2), 1991, pp. 265-266.
Tan et al., Fabrication and characterization of three-dimensional poly(ether-ether-ketone)1-hydrosyapatite biocomposite scaffolds using laser sintering, Proc. IMechE., 219, Part H: J. Engineering in Medicine, pp. 183-194.

* cited by examiner

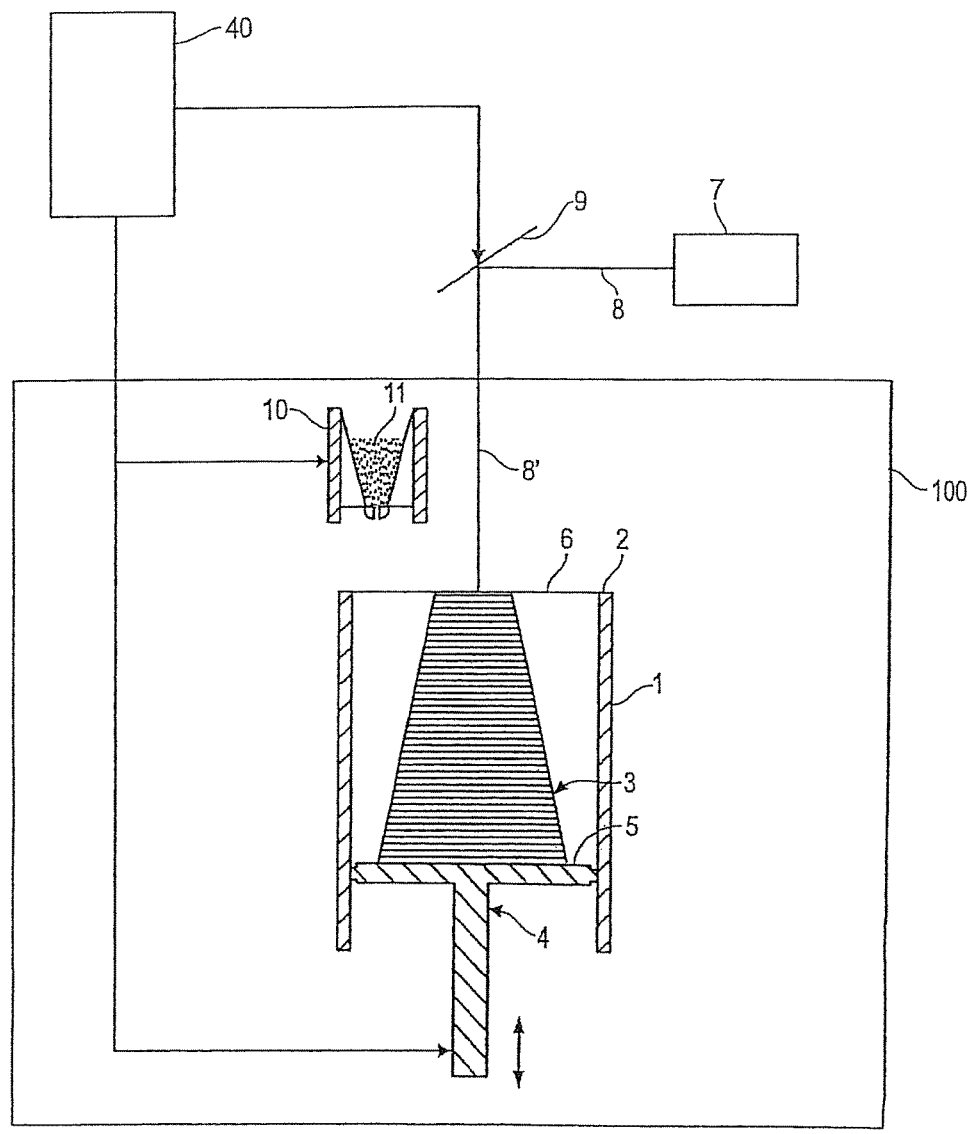
*Prior Art*

SELECTIVE SINTERING OF STRUCTURALLY MODIFIED POLYMERS

FIELD OF THE INVENTION

The present invention relates to a process for manufacturing a three-dimensional object from a powder by selective sintering by means of electromagnetic radiation, wherein the powder comprises a polymer or copolymer. Furthermore, the present invention relates to a three-dimensional object manufactured by said process, an apparatus for manufacturing a three-dimensional object by means of said process and the use of a preselected polymer powder in said process.

As for example known from DE 44 10 046, a process for manufacturing a three-dimensional object by selective sintering by means of electromagnetic radiation may be carried out layer-wise by means of a source for electromagnetic radiation. In such a process, a three-dimensional object is manufactured layer-wise by applying layers of powder and bonding these layers to each other by selective solidification of the powder at positions corresponding to cross-sections of the object.

DESCRIPTION OF BACKGROUND ART

FIG. 1 exemplary shows a laser sintering device by means of which a process for layer-wise manufacturing of a three-dimensional object may be performed. As is apparent from FIG. 1, the device comprises a container 1. This container is open to the top and is limited at the bottom by a support 4 for supporting an object 3 to be formed. By the upper edge 2 of the container (or by its sidewalls) a work plane 6 is defined. The object is located on the top side of the support 4 and is formed from a plurality of layers of a building material in powder form which is solidifiable by means of electromagnetic radiation, wherein the layers are in parallel to the top side of the support 4. Thereby, the support is moveable in a vertical direction, i.e. in parallel to the sidewall of the container 1 via a height adjustment device. Therewith, the position of the support 4 can be adjusted relatively to the work plane 6.

Above the container 1, or rather the work plane 6, an application device 10 is provided for applying the powder material 11 to be solidified onto the support surface 5 or a previously solidified layer. Also, an irradiation device in the form of a laser 7, which emits a directed light beam 8, is arranged above the work plane 6. This light beam 8 is directed as deflected beam 8' towards the work plane 6 by a deflection device 9 such as a rotating mirror. A control unit 40 allows to control the support 4, the application device 10 and the deflection device 9. The items 1 to 6, 10 and 11 are located within the machine frame 100.

In the manufacturing of the three-dimensional object 3, the powder material 11 is applied layer-wise onto the support 4 or a previously solidified layer and is solidified at the positions of each powder layer corresponding to the object by means of the laser beam 8'. After each selective solidification of a layer, the support is lowered by the thickness of the powder layer to be subsequently applied.

Many modifications of processes and devices for manufacturing a three-dimensional object by selective sintering by means of electromagnetic radiation compared to the system described above exist, which can also be used. For example, instead of using a laser and/or a light beam, other systems to selectively deliver electromagnetic radiation could be used, such as, e.g., mask exposure systems or the like.

However, in previous processes for selective sintering by means of electromagnetic radiation of polymer powders, insufficient attention was paid to the mechanical properties of the manufactured object.

OBJECT OF THE INVENTION

Therefore, the object of the present invention is to provide an improvement of a process for manufacturing a three-dimensional object by selective sintering by means of electromagnetic radiation of polymer powders, which results in improved mechanical properties of the manufactured objects.

SUMMARY OF THE INVENTION

Various aspects, advantageous features and preferred embodiments of the present invention as summarized in the following items, respectively alone or in combination, contribute to solving the object of the invention:

(1) A process for manufacturing a three-dimensional object from a powder by selective sintering by means of electromagnetic radiation, wherein the powder comprises a polymer or copolymer which has at least one of the following structural characteristics:

(i) at least one branching group in the backbone chain of the polymer or copolymer, provided that in case of the use of polyaryletherketones (PAEK) the branching group is an aromatic structural unit in the backbone chain of the polymer or copolymer;

(ii) modification of at least one end group of the backbone chain of the polymer or copolymer;

(iii) at least one bulky group in the backbone chain of the polymer of copolymer, provided that in case of the use of polyaryletherketones (PAEK) the bulky group is not selected from the group consisting of phenylene, biphenylene, naphthalene and $CH_2$— or isopropylidene-linked aromatics;

(iv) at least one aromatic group non-linearly linking the backbone chain.

(2) The process according to item (1), wherein successive layers of the object to be formed from solidifiable powder material are subsequently solidified at positions corresponding to the cross section of the object.

(3) The process according to item (1) or (2), in which process the electromagnetic radiation is provided by a laser.

(4) The process according to any one of the preceding items, which comprises a predefined and/or controlled cooling step after the sintering step.

(5) The process according to item (4), which comprises a step of cooling the object after completion of the object from a temperature being 1-50° C., preferably 1-30° C. and more preferably 1-10° C. lower than $T_m$ of the polymer or copolymer comprised in the powder, to $T_G$ of the polymer or copolymer comprised in the powder, at a cooling rate of 0.01-10° C./min, preferably 0.1-5° C./min and more preferably 1-5° C./min, wherein $T_m$ is the melting point and $T_G$ is the glass transition temperature of the polymer or the copolymer comprised in the powder.

(6) The process according to any one of the preceding items, wherein the powder comprises a polymer or copolymer having a melting point $T_m$ in a range of 100° C. to 450° C., preferably 150° C. to 400° C. and more preferably 250° C. to 400° C.

(7) The process according to any one of the preceding items, wherein the powder comprises a polymer or a copolymer, having a glass transition temperature $T_G$ in a range of 50 to 300° C., preferably 100° C. to 300° C. and more preferably 130 to 250° C.

(8) The process according to any one of the preceding items, wherein the polymer or copolymer has a number average $M_n$ of at least 10,000, more preferably 15,000 to 200,000 and in particular 15,000 to 100,000 or a weight average $M_w$ of at least 20,000, and more preferably 30,000 to 500,000 and in particular $M_w$ 30,000 to 200,000.

(9) The process according to any one of the preceding items, wherein the polymer or copolymer has a polymerization degree n of 10 to 10,000, more preferably 20 to 5000 and in particular 50 to 1000.

(10) The process according to any one of the preceding items, wherein the polymer or copolymer contains at least one aromatic group in the backbone chain, preferably in the repeating unit of the backbone chain.

(11) The process according to any one of the preceding items, wherein according to modification (iv) at least one non-linear linking aromatic group is contained in the repeating unit of the backbone chain.

(12) The process according to item (11), wherein according to modification (iv) the non-linear linking aromatic groups are independently selected from the group of 1,2- and 1,3-phenylene, 1,3-xylylene, 2,4'- and 3,4'-biphenylene, and 2,3- and 2,7-naphthalene.

(13) The process according to item (11) or (12), wherein according to modification (iv) the polymer or copolymer contains at least one additional, linear-linking aromatic group which is different from the non-linearly linking aromatic group and/or at least one branching group, in the backbone chain, preferably in the repeating unit of the backbone chain.

(14) The process according to any one of the preceding items, wherein the aromatic groups are independently from each other selected from unsubstituted or substituted, monocyclic or polycyclic aromatic hydrocarbons.

(15) The process according to item (13) or (14), wherein according to modification (iv) the linear linking aromatic groups are independently from each other selected from the group consisting of 1,4-phenylene, 4,4'-biphenylene, 4,4'-isopropylidene diphenylene, 4,4'-diphenylsulfone, 1,4-, 1,5-, 2,6-naphtalene, 4,4"-p-terphenylene and 2,2-bis-(4-phenylene)-propane.

(16) The process according to any one of the preceding items, wherein according to modification (i) the branching group is an aliphatic hydrocarbon, an aromatic hydrocarbon or a heteroarene which has at least one substituent or one side chain, in case of the use of polyaryletherketones (PAEK), the branching group is an aromatic structural unit in the backbone chain of the polymer or copolymer.

(17) The process according to item (16), wherein according to modification (i) the side chains independently from each other are selected from the group consisting of C1 to C6 unbranched or branched, chain- or ringshaped alkyl- or alkoxy groups and aryl groups.

(18) The process according to item (16) or (17), wherein according to modification (i) the side chains independently from each other are selected from the group consisting of methyl, isopropyl, tert-butyl or phenyl.

(19) The process according to any one of the preceding items, wherein according to modification (ii) the end groups of the backbone chain are modified by terminal alkyl, alkoxy, ester and/or aryl groups.

(20) The process according to any one of the preceding items, wherein according to modification (iii) the bulky group is an aromatic or non-aromatic group, in case of the use of polyaryletherketones (PAEK), the bulky group is not selected from the group consisting of phenylene, biphenylene, naphthalene and $CH_2$— or isopropylidene-linked aromatics.

(21) The process according to item (20), wherein according to modification (iii) the bulky group is a polycyclic aromatic or non-aromatic group.

(22) The process according to items (20) or (21), wherein according to modification (iii) the bulky group is selected from phenylene, naphthalene, anthracene, biphenyl, fluorenes, terphenyl, decaline or norbornane.

(23) The process according to any one of the preceding items, wherein a mixture of at least two different polymers or copolymers is used, wherein at least one of the admixed (co-)polymer components has at least one of the structural characteristics mentioned in item 1.

(24) The process according to any one of the preceding items, wherein the polymer or copolymer is formed on the basis of polyamide (PA), polyaryletherketone (PAEK), polyarylethersulfone (PAES), polyester, polyether, polyolefines, polystyrene, polyphenylenesulfide, polyvinylidenefluoride, polyphenyleneoxide, polyimide or a block copolymer that comprises at least one of the aforementioned polymers.

(25) The process to any one of the preceding items, wherein the polymer or copolymer is formed on the basis of polyamide (PA), polyaryletherketone (PAEK), polyarylethersulfone (PAES) or a block copolymer comprising at least one of the aforementioned polymers.

(26) The process according to item (24) or (25), wherein the block copolymer is preferably a polyaryletherketone (PAEK)/polyarylethersulfone (PAES)-diblock copolymer or a PAEK/PAES/PAEK-triblock copolymer.

(27) The process according to any one of the preceding items, wherein the polymer is a polyaryletherketone (PAEK) formed on the basis of polyetheretherketone (PEEK), polyetherketoneketone (PEKK), polyetherketone (PEK), polyetheretherketoneketone (PEEKK), polyetherketoneetherketoneketone (PEKEKK), polyaryletheretheretherketone (PEEEK) or a copolymer comprising at least one of the aforementioned polymers.

(28) The process according to item (27), wherein the polyaryletherketone (PAEK) is formed on the basis of a polyetherketoneketone (PEKK) polymer or copolymer.

(29) The process according to any one of the preceding items, wherein the polymer or copolymer on the basis of polyaryletherketone (PAEK) has a melting viscosity of 0.05-1.0 $kN*s/m^2$, preferably 0.15-0.6 $kN*s/m^2$ and in particular of 0.2-0.45 $kN*s/m^2$.

(30) The process according to any one of items (24) to (29), wherein the polyaryletherketone (PAEK) polymer or copolymer has a polymerization degree n of preferably 10 to 1,000, more preferably 20 to 500, and in particular 40 to 250.

(31) The process according to any one of the items (27) to (30), wherein the polyetherketoneketone (PEKK) polymer or copolymer comprises 1,4-phenylene as the linear-linking aromatic group and 1,3-phenylene as the non-linear linking aromatic group in the backbone chain of the polymer, preferably in the repeating unit of the backbone chain.

(32) The process according to any one of the items (27) to (31), wherein the ratio of repeating units comprising, respectively, at least one 1,4-phenylene unit to repeating units comprising, respectively, one 1,3-phenylene unit is 90/10-10/90, preferably 70/30-10/90, more preferably 60/40 to 10/90.

(33) A three-dimensional object obtained by a selective sintering of a polymer, a copolymer or a blend of polymers in powder form by means of electromagnetic radiation, wherein the polymer or copolymer used for the powder has at least one of the following structural characteristics:
  (i) at least one branching group in the backbone chain of the polymer or copolymer, provided that in case of the use of polyaryletherketones (PAEK) the branching group is an aromatic structural unit in the backbone chain of the polymer or copolymer;
  (ii) modification of at least one end group of the backbone chain of the polymer or copolymer;
  (iii) at least one bulky group in the backbone chain of the polymer of copolymer, provided that in case of the use of polyaryletherketones (PAEK) the bulky group is not selected from the group consisting of phenylene, biphenylene, naphthalene and $CH_2$— or isopropylidene-linked aromatics;
  (iv) at least one aromatic group non-linearly linking the backbone chain.
(34) The three-dimensional object according to item (33), wherein the polymer or copolymer is defined as denoted in the items 6 to 32.
(35) An apparatus for manufacturing a three-dimensional object from a powder by selective sintering by means of electromagnetic radiation of the powder, wherein said apparatus comprises a temperature control device arranged for setting a predefined cooling of the object after completion of manufacturing the object.
(36) The apparatus according to item (35), wherein the cooling rate set by means of the temperature control device depends on the type of polymer, copolymer or polymer blend comprised in the powder.
(37) The apparatus according to item (35) or (36), wherein the temperature control device is set depending on the predetermined type of polymer, copolymer or polymer blend.
(38) A manufacturing system including an apparatus according to any one of items (35) to (37) and a powder comprising at least one polymer or copolymer as defined in items (6) to (32).
(39) A use of a polymer powder in the manufacture of a three-dimensional object by means of selective electromagnetic irradiation sintering, wherein the polymer is preselected from a polymer or copolymer having at least one of the following structural characteristics:
  (i) at least one branching group in the backbone chain of the polymer or copolymer, provided that in case of the use of polyaryletherketones (PAEK) the branching group is an aromatic structural unit in the backbone chain of the polymer or copolymer;
  (ii) modification of at least one end group of the backbone chain of the polymer or copolymer;
  (iii) at least one bulky group in the backbone chain of the polymer of copolymer, provided that in case of the use of polyaryletherketones (PAEK) the bulky group is not selected from the group consisting of phenylene, biphenylene, naphthalene and $CH_2$— or isopropylidene-linked aromatics;
  (iv) at least one aromatic group non-linearly linking the backbone chain.
(40) The use according to item (39), wherein the polymer or copolymer is defined as in items (6) to (32).

It has been surprisingly found that when structurally special modified polymers or copolymers are applied in a selective sintering process, a marked improvement of certain, very advantageous mechanical properties including, but not limited to high stiffness, high compression strength, high impact strength, high maximal tensile- and bending strength as well as high elongation at break and high heat deflection temperature are obtained in the manufactured three-dimensional objects, while on the other hand opposing characteristics such as good chemical resistance and low post crystallisation are nevertheless well balanced. Furthermore, it has been surprisingly found that by particular process conditions, or by observing the cooling rate after sintering, respectively, provide for significant improvements of the aforementioned mechanical properties and a good balance with the opposing characteristics. Moreover, a markedly improved combination of both, appropriately set crystallinity and low porosity in the manufactured three-dimensional object can be achieved, which contributes to a further improvement of the above mentioned properties. The advantages of the invention are particularly feasible when modified polyaryletherketone polymers or polyaryletherketone copolymers or polyamide polymers or polyamide copolymers respectively are used as polymer material of the polymer powder. The advantageous combinations of characteristics realized by the present invention are mainly attributed to the fact that the structurally special modified polymers and copolymers enable the setting of an advantageous range of crystallinity in the manufactured three-dimensional object at coexistent low porosity. Furthermore, the advantages of the invention are also feasible for composites, wherein the value of crystallinity relates to the polymer matrix of the composite. Such composites comprise one or more fillers and/or additives besides of a matrix of the respective polymer, copolymer or polymer blend.

For polymers in general, the final crystallinity in the obtained object is 80% or less, preferably 50% or less, more preferably 5-70%, even more preferably 15-50% and in particular 15-35%. Especially for polyaryletherketones (PAEK), for example, the final crystallinity in the obtained object is 5 to 45%, preferably 10 to 40%, more preferably 15 to 35%, even more preferably 15 to 30%, and in particular 20 to 25%. Especially for polyamides (PA), for example, the final crystallinity in the obtained object is 10 to 50%, preferably 15 to 40%, more preferably 15 to 35% and in particular 20 to 30%. The porosity for polymers in general is less than 10%, preferably 5%, more preferably 3% and in particular less than 2%.

As a preferred alternative to classical polymer processing technologies involving pressure processing of polymers, like e.g. injection molding, the process according to the present invention can be carried out layer-wise in an additive process, wherein successive layers of the object to be formed from solidifiable powder material are subsequently solidified by the electromagnetic radiation at positions corresponding to the cross-section of the object.

BRIEF DESCRIPTION OF THE DRAWINGS

FIG. 1 exemplary shows a laser sintering device for a layer-wise manufacturing of a three-dimensional object.

DESCRIPTION OF PREFERRED EMBODIMENTS

The present invention is now described in more detail by referring to further preferred and further advantageous embodiments and examples, which are however presented for illustrative purposes only and shall not be understood as limiting the scope of the present invention.

In case the polymer powder material comprises a polymer or copolymer having at least one, optionally a combination of conditions selected from the group consisting of (i) at least one branching group in the backbone chain, (ii) a modification of terminal groups, (iii) at least one bulky group, and (iv) at least one aromatic group non-linearly linking the backbone chain, this can result in a marked improvement of certain, very advantageous mechanical-properties including high stiffness, high compression strength, high impact strength, high maximum tensile- and flexural-strength as well as high elongation at break and high heat distortion, while on the other hand opposing properties such as good chemical resistance and low after-shrinkage by post-crystallisation are nevertheless well balanced. Furthermore, a decrease of the porosity of the manufactured object can be made possible additionally contributing to the improvement of the mechanical properties of the manufactured object.

Objects manufactured by selective sintering by means of electromagnetic radiation of a powder comprising at least one polymer typically have a value of crystallinity substantially higher crystallinity than objects manufactured by classical polymer processing technologies like e.g. injection molding. That is, in a process for manufacturing a three-dimensional object from a powder by selective sintering by means of electromagnetic radiation of the powder comprising at least one polymer, for example of a type as it is illustrated in FIG. 1, the crystallinity of the manufactured object tends to become high if no structurally modified polymer or copolymer according to the invention is used. Specifically, in the layer-wise building process, a high powder bed temperature lying at about 1-50° C., preferably 1-30° C., even more preferably 1-20° C. and most preferably 1-10° C. below the melting point $T_m$ of the polymer is generally used. The object is typically exposed to relatively high processing temperatures for a substantial period of time and usually still undergoes very long cooling periods. To prevent or minimize curling of the object during the building process, the processing temperature should be kept close to the melting point of the polymer contained in the powder in order to provide for a good connection between successive layers and to minimize the formation of pores due to an inadequately melting of the powder particles. Consequently, during the whole building process, the temperature of the powder bed is kept above the crystallization temperature $T_c$ of the polymer. The formed object itself may be exposed for a long time to temperatures above $T_c$. At the end of the building process, when all heating sources of the sintering machine are switched off, the cooling through $T_c$ of the object starts due to natural heat loss to the environment. Because of the low heat conductivity of the polymer powder and the large powder bed, this may take hours to days, depending on the polymer powder used and the processing conditions, i.e. without predefining a proper cooling rate—which would possibly further increase crystallization of the polymer object, eventually during the cooling process. Without proper control, even post-crystallization of the laser sintered polymer object may occur. As a consequence, relatively high and partly extremely high crystallinities are obtained in the manufactured object without the controlled cooling step according to the present invention. In turn, without properly limiting crystallinity, relevant mechanical properties of the object may be deteriorated.

On the other hand, in the selective sintering process according to the present invention, the crystallinity in the manufactured object may be beneficially adjusted still high enough to also provide for positive influences on high chemical resistance, low post shrinkage at temperatures above $T_g$ or high stiffness of the manufactured object. Thus, an excellent balance of properties can be achieved by the present invention.

When the crystallinity of the material manufactured from polymer powder material is properly limited and preferably adjusted within a particular range, a marked improvement of certain, very advantageous mechanical properties like tensile strength, Young's modulus and elongation at break can be attained. Particularly effective and preferred means in order to limit the crystallinity of the manufactured object are: 1) Preselecting a suitable type of polymer material, 2) paying attention to the structural characteristics and/or modifications of the polymer comprised by the preselected powder, and/or 3) paying attention to a predefined and/or controlled cooling step after completion of the sintering process of the object.

Thus, according to a preferred embodiment of the invention, a predefined and/or controlled cooling step is preferably applied to the object after completion of the object after the sintering. The predefined and/or controlled cooling step may be realized by predefined slow cooling, possibly slower than native (passive) cooling, or by active cooling in order to provide fast cooling. As the conditions of the predefined and/or controlled cooling step mainly depend on the type and specification of the polymer, copolymer or polymer blend used, useful settings for said cooling step can be experimentally tested with the proviso that the final crystallinity in the manufactured object is controlled such that the manufactured object has the desired mechanical characteristics.

However, the cooling rate after completion of the object may also affect the curling and thus the dimensional stability of the object. It has been surprisingly found that the cooling rate can be predefined such that the three-dimensional object has not only a decreased crystallinity providing the above mentioned advantageous mechanical properties, but also a high dimensional stability, that is, it does not curl.

A suitable type of polymer material can be selected from polyaryletherketone (PAEK), polyarylethersulfone (PAES), polyamides, polyesters, polyethers, polyolefines, polystyrenes, polyphenylensulfides, polyvinylidenfluorides, polyphenylenoxides, polyimides and copolymers comprising at least one of the aforementioned polymers, wherein the selection is however not limited to the above mentioned polymers and copolymers. For example, suitable PAEK polymers and copolymers are preferably selected from polyetheretherketone (PEEK), polyetherketoneketone (PEKK), polyetherketone (PEK), polyetheretherketoneketone (PEEKK), polyetherketoneetherketoneketone (PEKEKK), polyaryletheretheretherketone (PEEEK) and copolymers comprising at least one of the aforementioned polymers. Suitable polyamide polymers or copolymers can be selected from the group consisting of polyamide PA6 T/6I, poly-m-xylylenadipamide (PA MXD6), polamide 6/6 T, polyamide elastomers like polyetherblockamide such as PEBAX™-based materials, polyamide 6, polyamide 66, polyamide 11, polyamide 12, polyamide 612, polyamide 610, polyamide 1010, polyamide 1212, polyamide PA6 T/66, PA4 T/46 and copolymers comprising at least one of the aforementioned polymers. Suitable polyesterpolymers or copolymers can be selected from the group consisting of polyalkylenterephthalates (e.g. PET, PBT) and their copolymers with isophthalic acid and/or 1,4-cyclohexanedimethylole. Suitable polyolefine polymers or copolymers can be selected from the group consisting of polyethylene and polypropylene. Suitable polystyrene polymers or copolymers can be selected from the group consisting of syndiotactic and isotactic polystyrenes. Respective structural characteristics defined in the enclosed claims can be considered by suitable methods and means, structural changes, selection of suitable components of the co(polymers) and so on.

A polymer or copolymer particularly preferable for the selective sintering process according to the invention has at least one of the following structural characteristics and/or modifications:
- (i) at least one branching group in the backbone chain of the polymer or copolymer, provided that in case of the use of polyaryletherketones (PAEK) the branching group is an aromatic structural unit in the backbone chain of the polymer or copolymer;
- (ii) modification of at least one end group of the backbone chain of the polymer or copolymer;
- (iii) at least one bulky group in the backbone chain of the polymer of copolymer, provided that in case of the use of polyaryletherketones (PAEK) the bulky group is not selected from the group consisting of phenylene, biphenylene, naphthalene and $CH_2$— or isopropylidene-linked aromatics;
- (iv) at least one aromatic group non-linearly linking the backbone chain.

The structural modifications (i) to (iv) are explained in the following.

By the structural characteristic (i) "branching group", a group G is to be meant having, besides of the bonds linking the portions of the backbone chain of the polymer (portions A and B of the backbone chain), as shown below
portion A of backbone chain

portion B of backbone chain,
at least one side chain and substituent S respectively. Advantageously, G is an aliphatic hydrocarbon, an aromatic hydrocarbon or a heteroarene. The side chains or the substituents "S" respectively affect the mobility of the polymer chain in the melt and thus enable to suitably influence the final crystallinity of the manufactured object. Preferably, the substituents are independently from each other selected from the group consisting of C1 to C6 unbranched or branched, chain- or ringshaped alkyl or alkoxy groups and aryl groups, wherein methyl, isopropyl, tert-butyl or phenyl are particularly preferred. Furthermore, side chains or substituents S are preferred which respectively allow further derivatizations of the obtained polymers or copolymers—optionally after deprotection—, for example the synthesis of graft copolymers. The above exemplary illustration of the branching group merely shows one branching group. However, more branching groups may exist in the polymer, in particular in case the branching group is a part of the repeating unit of the polymer. The structural unit (G-S) also may be single or multiple component of the above shown portions A and/or B of the backbone chain. In case of the use of polyaryletherketones (PAEK), the branching group is an aromatic structural unit in the backbone chain of the polymer or copolymer.

By the structural characteristic (ii) "modification of at least one terminal group of the backbone chain of the polymer or copolymer" there is to be meant, as shown below, the derivatisation of one end or both ends X and Y of the backbone chain of the polymer by $(X)_n$— backbone chain of the polymer

—$(Y)_m$ → $(R_1)_n$— backbone chain of the polymer

—$(R_2)_m$ means of the terminal groups $R_1$ and/or $R_2$, wherein n, m are independently from each other 0 or an integer number, preferably 1, wherein both n, m are not concurrently 0. As denoted by n, m, multiple modifications of terminal groups may exist. In this embodiment it is relevant that respectively unmodified terminal groups X and Y may serve as seed crystal and hence may stimulate an undesired excessive crystallisation. Therefore, at least one of the terminal groups X and Y of the polymer of copolymer can be derivatised in order to interfere with crystallisation and in this way limiting the crystallinity of the manufactured object. Preferably, the terminal groups $R_1$ and $R_2$ are independently selected from alkyl-, alkoxy-, ester- and/or aryl groups. For example, $R_1$ and $R_2$ are independently from each other selected from the group consisting of branched or non-branched C1-C6 alkyl groups, preferably methyl, isopropyl or tert-butyl; branched or non-branched C1-C6 alkoxy groups, preferably methoxy, isopropyloxy, t-butyloxy; substituted or unsubstituted C1-C6 aliphatic ester groups, preferably methyl ester, ethyl ester, isopropyl ester or tert-butyl ester; substituted or unsubstituted aromatic ester groups, preferably benzoic ester and substituted or unsubstituted aryl groups, preferably phenyl, naphthyl, anthracenyl. The terminal groups may also be selected such that they result in a chain extension by a chemical reaction with each other at temperatures preferably above $T_m$ of the polymer, for example polycondensation, electrophilic or nucleophilic substitution, or coupling reaction. This in turn brings about that the final crystallinity within the object decreases by an increased molar mass.

By the structural characteristic (iii) "bulky groups", for example cycloalkyls like cyclohexyl or polycyclic cycloalkyls like decalines or norbornanes which may contain heteroatoms within their ring structure are meant. Further examples for bulky groups are aromatics like phenylene or condensed polycyclic aromatics or heteroaromates, for example naphthalene or anthracene, fluorene and fluorene derivatives, or polynuclear aromatic hydrocarbons like biphenylene or terphenylene. The bulky groups represent rigid rod segments within the polymer chain, thus can interfere with crystallisation and contribute to a lower final crystallinity within the manufactured object. The selection of the bulky group depends on the type of polymer or copolymer. While for example in case of an aliphatic polymer such as polyethylene already one phenylene unit may represent a bulky group, phenylene can not be regarded as a bulky group in case of a polyaryletherketone which by definition contains phenylene units. In case of the use of polyaryletherketones (PAEK), for the embodiment according to structural characteristic iii), the bulky group is not selected from the group consisting of phenylene, biphenylene, naphthalene and CH$_2$— or isopropylidene-linking aromatics.

By the structural characteristic (iv) "non-linearly linking aromatic groups", aromatic groups are meant which link portions of the backbone chain such that they are positioned non-linearly to each other, that is, the angle between the portions of the backbone chain is different from 180°.

By the incorporation of non-linearly linking aromatic groups in the backbone chain of a polymer, the final crystallinity in the manufactured object can be decreased in a controlled way, whereby advantageous mechanical properties like Young's modulus, tensile strength and elongation at break are obtained. In addition, the melting point of the polymer can be decreased by the incorporation of non-linear linking aromatic groups such that it is within a particularly advantageous temperature range, and the glass temperature can be set such that the manufactured object has a particularly advantageous heat distortion temperature.

Non-linearly linking aromatic groups are, for example, 1,3-phenylene and 1,2-phenylene, since they link together the portions A and B of the backbone chain of the polymer as shown below

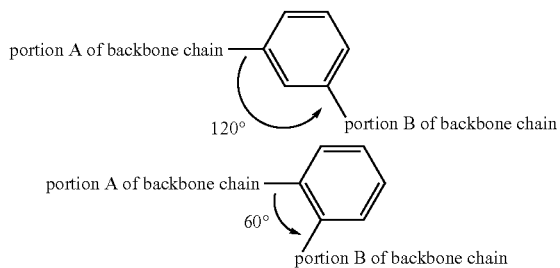

at an angle of 120° and 60°, respectively. Further preferred non-linear aromatic groups are for example 1,3-xylylene, 2,4' and 3,4'-biphenylene as well as 2,3- and 2,7-naphthalene.

In contrast to a non-linearly linking group, a linearly linking aromatic group links the portions of the backbone chain at an angle of 180°. For example, 1,4-phenylene represents a linearly linking aromatic group, since the schematically depicted portions A and B of the backbone chain of the polymer are linked at an angle of 180°, as shown below.

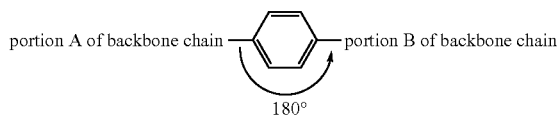

A linearly linking group consisting of a condensed aromatic can linearly link the portions of the backbone chain in two different ways, which is exemplary elucidated by means of naphthalene, but which is also valid for other condensed aromatics such as e.g. anthracene or phenanthrene. For example, naphthalene in the form of 1,4-naphthalene can link the portions A and B of the backbone chain of the polymer together at an angle of 180°. Alternatively, naphthalene can also linearly link in the form of 1,5-naphthalene or 2,6-naphthalene, wherein the schematically depicted portions A and B of the backbone chain are then arranged parallel to each other.

1,5-naphthalene as linearly linking unit:

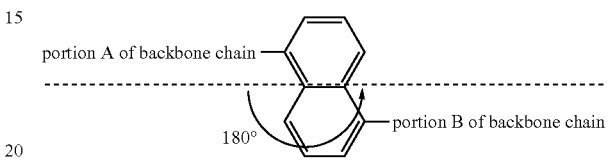

2,6-naphthalene as linearly linking unit:

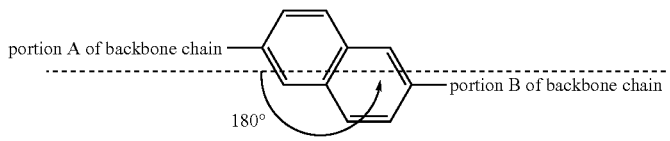

The above exemplary figures for the respectively non-linearly and linearly, linking aromatic group merely show one respectively non-linearly and linearly linking aromatic group. However, more respectively non-linearly and linearly linking groups may be present in the polymer, in particular if the non-linearly or linearly linking group is a component of the repeating unit of the polymer.

According to structural characteristic (iv), combinations of non-linearly linking aromatic groups and linearly linking aromatic groups are possible.

Furthermore, a suitably set molecular weight of the polymer contained in the powder can contribute to a significant decrease of the crystallinity in the manufactured object, which in turn results in a significant improvement of certain, very advantageous mechanical properties in the manufactured object. Thus, the molecular weight $M_n$ (average number) is preferably set to at least 10.000, more preferably 15.000 to 200.000 and in particular 15.000 to 100.000, or $M_w$ (weight average) is preferably set to at least 20.000, and more preferably 30.000 to 500.000, and in particular 30.000 to 200.000.

Analogous explanations as stated above for the molecular weight also apply for the melting viscosity of the polymer or copolymer. The melting viscosity correlates with the molecular weight of the polymer or copolymer as follows: the higher the molecular weight of a polymer or copolymer, the higher is its melting viscosity. Therefore, the preferred melting viscosities e.g. of polyaryletherketones and their copolymers in general are in a range of 0.05-1.0 kN*s/m$^2$, preferably 0.15-0.6 kN*s/m$^2$ and in particular 0.2-0.45 kN*s/m$^2$. The melting viscosity can be determined in a capillary viscometer at 400° C. and at a shearing rate of 1000 s$^{-1}$ according to an instruction of US-Patent 2006/0251878 A1.

The polymers or copolymers can be admixed with an alloying component in a mixture (blend), wherein a blend of at least two different polymers or copolymers is used. In such blends, it is preferred that at least one component of the blend decreases the final crystallinity of the manufactured object.

For the desired result, in particular the crystallinity within the manufactured object as well as its mechanical properties, beyond the general conditions for the structural characteristics (i) and (iii) comprised in the polymer or copolymer, for polyaryletherketones (PAEK) the following limitations apply:

for feature (i): the branching group is an aromatic structural unit in the backbone chain of the polymer or copolymer, and for feature (iii): the bulky group is not selected from the group consisting of phenylene, biphenylene, naphthalene and $CH_2$— or isopropylidene-linked aromatics.

For other types of polymers, in particular polyamides (PA), polyesters, polyethers, polyolefines, polystyrenes, polyphenylensulfides, polyvinylidenfluorides, polyphenylenoxides, polyimides or a copolymer comprising at least one of the aforementioned polymers, the limitations made for polyaryletherketones do not apply for.

In the following, some significant structural properties or modifications of a polymer- or copolymer material are exemplary described by means of PAEK polymers and -copolymers which are suitable for a preselection applicable to a selective sintering process by means of electromagnetic radiation. It is obvious for a person skilled in the art that the below described structural properties or modifications can likewise be applied to other types of polymers or copolymers.

The formula shown below shows a general structure of PAEK or PAES polymers and copolymers that are preferred to manufacture laser sintered objects, wherein structural peculiarities preferred alone or in combination in order to obtain low crystallinities, will be further described below:

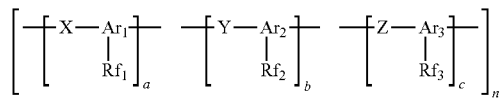

$Ar_1$, $Ar_2$ and $Ar_3$ are linearly or non-linearly linking, unsubstituted or substituted, monocyclic or polycyclic aromatic hydrocarbons, wherein independent from $Rf_1$, $Rf_2$ and/or $Rf_3$ being H, substituents can be optionally selected from: $Rf_1$, $Rf_2$, $Rf_3$ independently from each other are selected from the group consisting of C1-C6 straight chain, branched or cyclic alkyl and alkoxy groups, and aryl groups, preferably Me, i-Pr, t-Bu, Ph (for unsubstituted $Ar_1$, $Ar_2$ and $Ar_3$, $Rf_1$, $Rf_2$, $Rf_3$=H), wherein each $Ar_1$, $Ar_2$ and $Ar_3$ may have one or more substituent(s) $Rf_1$, $Rf_2$, $Rf_3$ respectively, X=O and/or S
Y=CO and/or $SO_2$
Z=$SO_2$, CO, O and/or S a is a low integer which is more than 0, preferably lower than 12, more preferably 1 to 6 and in particular 1 to 3, b is a low integer which is more than 0, and preferably lower than 12, more preferably 1 to 6 and in particular 1 to 3, c is 0 or a low integer, preferably lower than 12, more preferably 1 to 6 and in particular 1 to 3, n denotes the degree of polymerisation.

In the above general formula, the indices a, b and c denote the number of the respective units in the repeating unit of the polymer or the repeating units of the copolymer respectively, wherein one or more unit(s) of the same kind, e.g. the unit indexed with a, may be located between units of a different kind, e.g. the unit indexed with b and/or c. The location of the respective units in the repeating unit may be derived from the abbreviation of the PAEK derivative.

The above general formula for PAEK- or PAES polymers or
-copolymers shall be clarified by means of the following examples of a PAEK polymer according to the invention. Thus, in one embodiment of using PAEK according to the invention, $Ar_1$ is unsubstituted 4,4"-p-terphenylene, X=O and a=1, $Ar_2$ is unsubstituted 1,4-phenylene, Y is O and b=1 and $Ar_3$ is unsubstituted 1,4-phenylene, z is CO and c=1, wherein following structural formula results for this PAEK

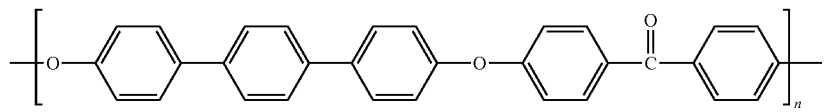

wherein n denotes the degree of polymerisation.

In PAEK polymers or copolymers, besides the conventional 1,4 phenylene, groups being more bulky as those selected from the group consisting of biphenylenes, naphthalenes and $CH_2$— or isopropylidene-linked aromatics shall be selected, like p-terphenylene.

The following two examples for the PAEK polymers PEKK and PEKEKK are examples for PAEK polymers having linearly linking aromatic groups. Thus, for example, for PEKK, $Ar_1$ is an unsubstituted 1,4-phenylene, X is O and a=1, $Ar_2$ is an unsubstituted 1,4-phenylene, Y is CO and b=2 and c=0, wherein the following structural formula results for PEKK

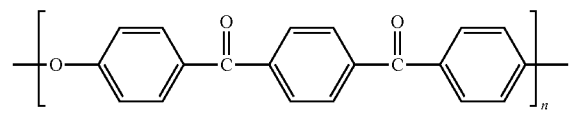

wherein n denotes the degree of polymerisation. In the further example PEKEKK, $Ar_1$ is unsubstituted 1,4-phenylene, X is O and a=2, $Ar_2$ is unsubstituted 1,4-phenylene, Y is CO and b=3 and c=0, wherein the following structural formula results for PEKEKK

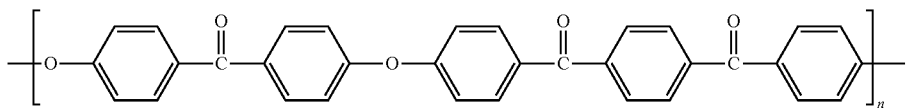

wherein n denotes the degree of polymerisation.

The following example shows a PAEK polymer applied according to the invention, namely a PEKK copolymer having non-linearly linking units. This PEKK copolymer has 2 different repeating units (cf. repeating unit A and B in the below structural formula).

Repeating Unit A:

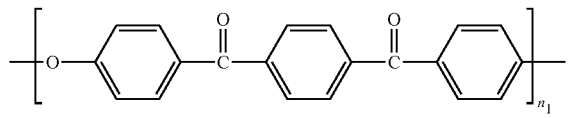

Repeating Unit B:

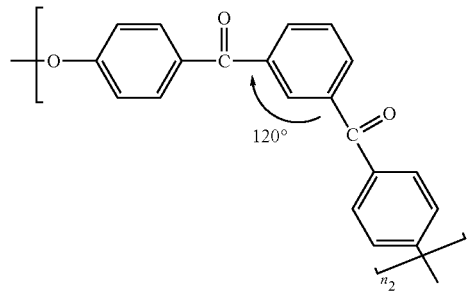

In the repeating unit A, $Ar_1$ is unsubstituted 1,4-phenylene, X is O and a=1, $Ar_2$ is unsubstituted 1,4-phenylene, Y is CO, b=2 and c=0. In the repeating unit B, $Ar_1$ is unsubstituted 1,4-phenylene, X is O and a=1, $Ar_2$ is unsubstituted 1,3-phenylene, Y is CO and b=1 and $Ar_3$ is 1,4-phenylene, Z is CO and c is 1. Depending on the synthesis, the repeating units A and B may be arranged strictly alternating, statistically or blockwise in the backbone chain of the copolymer. The degree of polymerisation n of this PEKK copolymer results from the sum of $n_1$ and $n_2$.

In selective sintering of the above described PEKK copolymers it was surprisingly found that the final crystallinity of the manufactured object is the lower, the higher the content of 1,3-phenylene units is (compare Example 1 with Example 2). Furthermore it was found that the melting point of the copolymer can be lowered by increasing the content of 1,3-phenylene units in the PEKK copolymer. Such a lowering of the melting point is an advantage for the procedural processing in laser sintering. Thereby, a lower temperature of the process chamber can be selected, which enables an energy efficient sintering process. Therefore, the ratio of 1,4-phenylene units $Ar_2$ in the repeating unit A to 1,3 phenylene units $Ar_2$ in the repeating unit B is preferably 90/10-10/90, more preferably 70/30-10/90 and in particular 60/40-10/90. Such PEKK copolymers can for example be obtained by electrophilic aromatic substitution of diphenylether as well as terephthalic-acid and -acid chloride, respectively, as the monomer having 1,4-phenylene units and isophthalic-acid and -acid chloride, respectively, as the monomer having 1,3-phenylene units.

Moreover, the ratio between the number of ketone groups Y and the number of ether- or thioether groups is preferably 1:4 to 4:1. Within this range, the final crystallinity in the manufactured object can be significantly reduced.

The larger the required space of the aromatic hydrocarbons $Ar_1$, $Ar_2$ and $Ar_3$, the more the aromatic hydrocarbons behave like a rigid rod segment, and the lower is the final crystallinity of the manufactured object. Hence, it is preferred that the aromatic hydrocarbon groups $Ar_1$, $Ar_2$ and $Ar_3$ are respectively and independently selected from the group consisting of 1,4-phenylene, 4,4'-biphenylene, 4,4'-isopropylidendiphenylene, 4,4'-diphenylsulfone, 1,4-, 1,5- and 2,6-naphthalene, 4,4''-p-terphenylene and 2,2-bis-(4-phenylene)-propane for linearly linking aromatic groups, and for non-linearly linking aromatic groups, they are respectively and independently selected from the group consisting of 1,2- and 1,3-phenylene, 1,3-xylylene, 2,4'- and 3,4'-biphenylene and 2,3- and 2,7-naphthalene.

In case of polyaryletherketones, branching groups can be provided by aromatic hydrocarbons $Ar_1$, $Ar_2$ and $Ar_3$ having substituents $Rf_1$, $Rf_2$, $Rf_3$, wherein in this case it is not relevant whether the linkage at the aromatic is linear or non-linear.

A further possibility for tailoring the polymer such that low crystallinities in the manufactured object are achieved after the selective sintering process is the use of a suitable copolymer. For PAEK, besides of the above mentioned PEKK copolymers, copolymers with polyarylethersulfone (PAES) are preferred, in particular preferably polyaryletherketone(PAEK)/polyarylethersulfone(PAES)-diblock copolymers or PAEK/PAES/PAEK-triblock copolymers, more preferably polyetherketone (PEK)/polyethersulfone (PES)-diblock copolymers or PEK/PES/PEK-triblock copolymers. It was found that the crystallinity of the manufactured object is the lower the higher the amount of the polyarylethersulfone-component is. Thus, the ratio of the number of sulfone groups Z to the number of keto groups Y is preferably between 50:50 and 10:90. Within this ratio range, a glass transition temperature ($T_g$) and a melting point ($T_m$) of the polymer material can be adjusted which is suitable for processing the polymer in an apparatus for manufacturing a three-dimensional object by a selective sintering by means of electromagnetic radiation. In order to provide a suitable processing temperature for the selective sintering process, said PEK/PES copolymers preferably have a $T_g$ higher than 180° C. and a melting temperature $T_m$ of 300 to 430° C.

The end groups of the backbone chain of the polymer or copolymer depend on the kinds of monomers used for synthesis and on the kind of polymerisation. In the following, two different kinds of PAEK synthesis schemes resulting in different kinds of PAEKs with different end groups are shown.

PAEKs can be normally synthesized in two ways, namely by electrophilic aromatic substitution (Friedel-Crafts-Acylation) or nucleophilic aromatic substitution. For example, in the nucleophilic synthesis of a PAEK, a 1,4-bishydroxy-benzene is polymerized with an 4,4' dihalogenated benzophenone component:

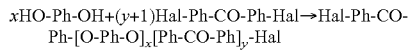

wherein Hal is F, Cl, Br and x and y denote the number of monomers incorporated in the polymer.

As a result, the PAEK backbone chain, in the above example PEEK may be terminated with a residual halogen group after the polymerization, most suitably with fluorine, optionally alternatively with chlorine or bromine, at none or one end (not shown) or at both ends (shown) of the backbone chain. The same applies for the synthesis of PAEK or polyethersulfone (PAES) copolymers, wherein the dihalogenated ketone unit may be substituted partly by a dihalogenated aromatic sulfone. The aromatic bishydroxy-component may likewise be partly or fully substituted by a bisthiol component.

For example, the halogen substituted ends of the polymer may be derivatized by a termination reaction with phenol:

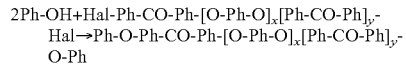

Preferably, Hal in the formulae above is F.

The same applies for the synthesis of PAEK- or polyethersulfone(PAES) copolymers, wherein the dihaloginated ketone unit is partly replaced by a dihaloginated aromatic sulfone unit. The aromatic bishydroxy component can be replaced partly or totally by a bisthiol component, too.

In the case of synthesis of PAEK polymers or copolymers by electrophilic aromatic substitution reaction, diacylaromates, e.g. aromatic diacids or preferably aromatic diacid chlorides or aromatic diacid anhydrides, are polymerized with a bisaromatic ether or thioether component. For example, for PEKK, this may result in PEKK polymers or copolymers with phenyl groups at none or one end (not shown) or both ends (shown) of the backbone chain:

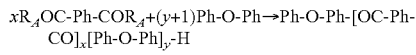

wherein $R_A$ is Cl or —OH and x and y denote the number of monomers incorporated in the polymer.

Alternatively, a synthesis by a single monomer route using, for example, an aromatic mono-acid chloride may be applied.

For example, the phenyl groups at the ends of the polymer may be derivatized by a termination reaction with benzoic acid chloride:

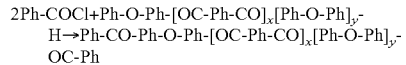

Irrespective if a nucleophilic or aromatic substitution reaction is chosen, to slow down crystallization of the polymer, the end groups may be preferably substituted, e.g. such that a PAEK polymer has the following formula:

wherein U is a linking moiety, for example NH, O, CO, CO—O—, SO, a single bond, —$(CH_2)_k$ wherein k is 1-6, or the like; and the left hand and right hand structural moieties $R_T$ may be the same or different structural groups, usually the structural moieties $R_T$ are the same.

Preferably, $R_T$ is selected from the group of unsubstituted or substituted aliphatic or aromatic hydrocarbon residues. U may be formed by direct reaction with the ends of the polymer or copolymer, for example a monofunctional hydroxy compound may form O as U, or it may be introduced as a substituent of the termination reagent, e.g. HO-Ph-COO-tert-butyl may form COO as U.

Furthermore, if it is necessary to increase the crystallization rate in order to adjust the crystallinity of the manufactured three-dimensional object appropriately, the polyaryletherketones with a halogenated end group can be terminated with ionic end groups like e.g. phenate salts like $NaOPhSO_3Na$ or $NaOPhCOPhOPhSO_3Na$. Subsequent acidification of the phenate salts with e.g. HCl leads to —$SO_3H$ end groups that show a slightly reduced nucleation effect.

Furthermore, in the following—again exemplary—now by means of PA polymers and -copolymers, further significant structural characteristics or modifications of a polymer- or copolymer-material are described, which are suitable for a preselection applicable to selective sintering process by means of electromagnetic radiation. For the person skilled in the art, it is apparent that the below described structural characteristics or modifications can in turn be applied to other types of polymers, too.

The formula below shows a general structure of partly aromatic PA polymers and -copolymers, which is preferred to manufacture laser sintered objects, wherein structural peculiarities necessary for obtaining low crystallinities are further described hereinafter:

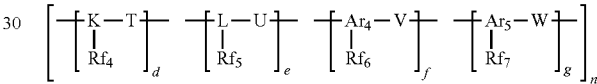

K, L=C2-C20 linear chain or cyclic alkyl groups, unsubstituted or substituted, $Ar_4$ and $Ar_5$ are linearly or non-linearly linking, unsubstituted or substituted, monocyclic or polycyclic aromatic hydrocarbons, wherein, independent from $Rf_4$, $Rf_5$, $Rf_6$ and/or $Rf_7$ being H, substituents can be optionally chosen from:

$Rf_4$, $Rf_5$, $Rf_6$, $Rf_7$ are independently from each other selected from the group consisting of C1-C6 linear chain, branched or cyclic alkyl- and alkoxy groups, and aryl groups, preferably selected from Me, i-Pr, t-Bu, Ph, wherein each of K, L, $Ar_4$ and $Ar_5$ respectively has one or more substituents $Rf_4$, $Rf_5$, $Rf_6$, $Rf_7$ (for unsubstituted K, L, $Ar_4$ and $Ar_5$, then $Rf_4$, $Rf_5$, $Rf_6$, $Rf_7$=H), T, U, V, W=—NH—CO— or —CO—NH—, d is a low integer number being more than 0 and preferably lower than 12, more preferably 1 to 6 and in particular 1 to 3, e, f and g are 0 or a low integer number, preferably lower than 12, more preferably 1 to 6 and in particular 1 to 3, n denotes the degree of polymerisation.

In the above general formula, the indices d, e, f and g denote the number of the respective repeating units of the polymer and in the respective repeating units of the copolymer, respectively, wherein one or more unit(s) of the same kind, e.g. the unit indexed with d, may be located between the units of another kind, e.g. the unit indexed with e, f and/or g.

The following example for a polyamide polymer used according to the invention shall clarify the above general formula for polyamide polymers.

The PA6-3-T polyamide polymer used according to the invention has following repeating units:

Repeating Unit A:

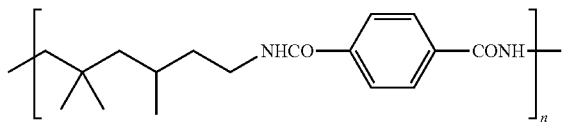

Repeating Unit B:

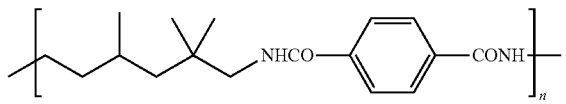

In repeating unit A, K is a n-hexane chain disubstituted in 2-position and monosubstituted in 4-position with $Rf_4$=methyl, T is —NH—CO— and d=1, e=0, $Ar_4$ is unsubstituted 1,4-phenylene, V is —CO—NH— and f=1 and g=0. Since there are 2 possibilities for the substituted hexane diamine to react with terephthalic acid, this results in a second repeating unit B. In repeating unit B, K is a n-hexane chain disubstituted in 2-position and monosubstituted in 4-position with $Rf_4$=methyl, T is —NH—CO— and d=1, e=0, $Ar_4$ is unsubstituted 1,4-phenylene, V is —CO—NH— and f=1 and g=0.

The following two examples for polyamide polymers PA 6 T/6I and PA MXD6 applied according to the invention are examples for polyamide polymers having non-linearly linking aromatic groups.

The polyamide PA 6 T/6I copolymer has 2 different repeating units (cf. repeating unit A and B in the below structural formula).

Repeating Unit A:

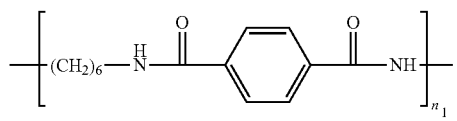

Repeating Unit B:

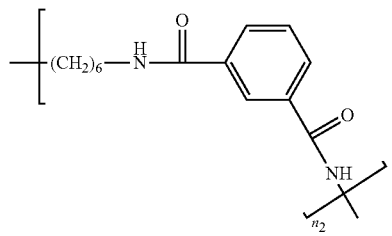

In the repeating unit A, K is an unsubstituted n-hexane chain, T is —NH—CO— and d=1, e=0, $Ar_4$ is unsubstituted 1,4-phenylene, V is —CO—NH— and f=1 and g=0. In the repeating unit B, K is an unsubstituted n-hexane chain, T is —NH—CO— and d=1, e=0, $Ar_4$ is unsubstituted 1,3-phenylene, V is —CO—NH— and f=1 and g=0. The degree of polymerisation n of this PA copolymer results from the sum of $n_1$ and $n_2$.

The following example shows a further polyamide applied according to the invention, namely poly-m-xylylene adipamide (polyamide MXD6) having non-linearly linking units in the backbone chain. According to the above general formula, for polyamide MXD6, K is an unsubstituted n-butane chain, T is —CO—NH— and d=1, e=0, $Ar_4$ is unsubstituted 1,3-xylylen, V is —NH—CO— and f=1 and g=0, wherein the following structural formula results for MXD6

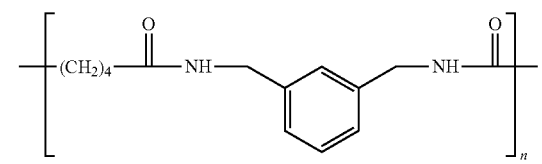

wherein n denotes the degree of polymerisation.

In case of polyamides, branching groups can be provided by aliphatic residues K and L and/or aromatic hydrocarbons $Ar_4$ and $Ar_5$ substituted with one or more of the substituents $Rf_4$, $Rf_5$, $Rf_6$ and $Rf_7$.

In case of polyamides, the bulky groups are selected from aromatic or non-aromatic groups. In particular, structural units selected from the group consisting of phenylene, naphthalene, anthracene, biphenyl, fluorenes, terphenyl, decaline or norbornane have to be considered.

In the remainder polymers, analogous considerations apply for the bulky groups as given for the polyamides.

The structural characteristics explained for PAEK polymers and -copolymers as well as for PA-(co)polymers can also be applied to other, already exemplary mentioned polymer- or copolymer-materials. The skilled person will appreciate that corresponding structure modifications can be made with the effect of reducing crystallinity in the produced three-dimensional object.

Furthermore, the powder may be a composite powder comprising one or more filler(s) and/or additive(s) besides a matrix of the respective polymer, copolymer or blend. Fillers may be used to further improve the mechanical properties of the manufactured object. For example, carbon fibers, glass fibers, Kevlar fibers, carbon nanotubes, or fillers, the filler preferably having a low aspect ratio (glass beads, aluminum grit, etc.) or mineral fillers such as titan dioxide may be incorporated in the powder comprising at least one polymer or copolymer. Furthermore, processing additives which improve the processability of the powder, e.g. free flowing agents such as those from the Aerosil series (e.g. Aerosil R974, Aerosil R812, Aerosil 200), or other functional additives such as heat stabilizers, oxidation stabilizers, color pigments (carbon black, graphite, etc.) may be used.

From the findings of the present invention it can be inferred that the following structural characteristics or modifications of polymers or copolymers provide for a decreased crystallinity in the manufactured object and thus are particularly preferred when a preselection of specific types of polymer or copolymer is made, e.g. among polyaryletherketones (PAEK), polyarylethersulfones (PAES), polyamides, polyesters, polyethers, polyolefines, polystyrenes, polyphenylensulfides, polyvinylidenfluorides, polyphenylenoxides, polyimides and copolymers comprising at least one of the aforementioned polymers:

a) Preselection of a polymer or copolymer having at least one of the following structural characteristics and/or modifications:

(i) at least one branching group within the backbone chain of the polymer or copolymer, provided that in the case of the use of polyaryletherketones (PAEK) the branching group is an aromatic structural unit in the backbone chain of the polymer or copolymer;

(ii) modifying at least one terminal group of the backbone chain of the polymer or copolymer;

(iii) at least one bulky group in the backbone chain of the polymer or copolymer, provided that in the case of the use of polyaryletherketones (PAEK) the bulky group is not selected from the group consisting of phenylene, biphenylene, naphthalene and $CH_2$— or isopropylidene-linked aromatics;

(iv) at least one aromatic group non-linearly linking the backbone chain, b) using relatively high molecular masses $M_n$ or $M_n$ or certain melt viscosities, c) using long chain lengths or high degrees of polymerisation, d) mixing or blending by admixing of at least two different polymers or copolymers.

The following examples are merely illustrative of the present invention and they should not be considered as limiting the scope of the invention in any way. The examples and modifications or other equivalents thereof will become apparent to those versed in the art in the light of the present entire disclosure.

EXAMPLES

The density of the manufactured three-dimensional object was measured according to ISO 1183 on a Kern 770-60 balance with a Satorius density determination set YDK 01. The porosity of the object can be determined via the density in case the theoretical density of 100% crystalline polymer, the theoretical density of amorphous polymer and the crystallinity of the manufactured polymeric object are known. The crystallinity in the manufactured object can be measured by means of dynamic differential calorimetry (DCC or DSC) according to DIN 53765.

Alternatively, the crystallinity can be determined via Wide Angle X-ray Scattering (WAXS) measurements. The procedure is known by the person skilled in the art. If the theoretical density values for the polymer are not known, the porosity can also be determined by micro-computerthomography measurements. A suitable device is e.g. the μ-CT40 supplied by SCANCO Medical AG, Brüttisellen, Switzerland. The procedure is known by the person skilled in the art.

The following examples are merely for illustration and should not be considered as limitative.

Reference Example

A powder manufactured from structurally unmodified PEEK (purchased from the company Victrex Plc, Thornton Cleveleys, Lancashire FY5 4QD, Great Britain) having an average particle size distribution of 48 μm, wherein the PEEK polymer has a molecular mass of Mn=23,000 and Mw=65,000 and a melt viscosity of 0.15 kN*s/m², is thermally treated above the glass transition temperature in an oven.

The PEEK powder having a bulk density of 0.45 g/cm3 was processed on a laser sintering machine of the type P700, that was modified by EOS company for high temperature applications. The temperature of the process chamber was 335° C.

After the laser sintering process was finished, the cooling rate was controlled by post-heating between 335° C. and Tg of PEEK (145° C.). The cooling rate showed a maximum average of 0.3° C./min.

The manufactured three-dimensional parts showed the following properties:

density=1.316 g/cm³
crystallinity (by DSC)=52%
porosity (calculated by density/crystallinity)=1.4%
Tensile strength test (ASTM D638, Type I):
    Young's modulus=4500 MPa
    Tensile strength=44 MPa
    Elongation at break=1.04%

Example 1 (According to the Invention)

A powder producible from a structurally modified PAEK having the structural formula

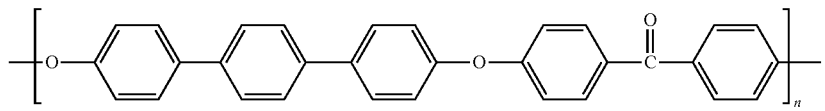

which may have an average particle size distribution of <100 μm, is thermally treated above the glass transition temperature in an oven.

The PAEK powder is processed on a laser sintering machine of the type P700, that was modified by EOS company for high temperature applications. The temperature of the process chamber is for example 10° C. below the melting point of the PAEK powder.

After the laser sinter process is finished, the cooling rate is controlled by post-heating between the temperature of the process chamber and Tg of the PAEK such that the cooling rate shows a maximum average of 0.3° C./min.

Example 2 (According to the Invention)

A powder producible from a structurally modified PEEK having the structural formula

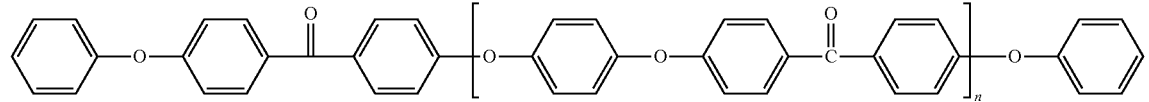

which has an average particle size distribution of 50 µm, wherein the PEEK polymer has a molecular weight of Mn=32,000 and Mw=65,000, is thermally treated above the glass transition temperature in an oven.

The PEEK powder is processed on a laser sintering machine of the type P700, that was modified by EOS company for high temperature applications. The temperature of the process chamber is for example 335° C.

After the laser sinter process is finished, the cooling rate is controlled by post-heating between 335° C. and Tg of the PEEK (about 145° C.) such that the cooling rate shows a maximum average of 0.3° C./min.

Example 3 (According to the Invention)

A powder producible from Polyamide PA6-3-T having the structural formula
Repeating Unit A:

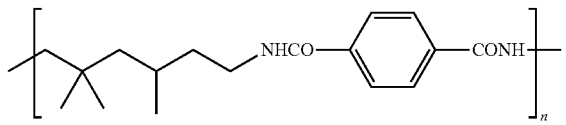

Repeating Unit B:

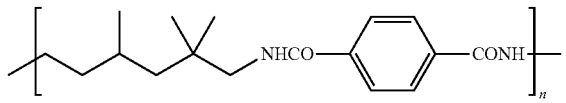

which may have an average particle size distribution of <100 µm is thermally treated above the glass transition temperature in an oven.

The polyamide powder is processed on a laser sintering machine of the type P700, that was modified by EOS company for high temperature applications. The temperature of the process chamber is for example 5° C. below the melting point of the polyamide.

After the laser sinter process is finished, the cooling rate is controlled by post-heating between the temperature of the process chamber and Tg of the polyamide such that the cooling rate shows a maximum average of 0.3° C./min.

Example 4 (According to the Invention)

A powder producible from structurally modified polyethylene PE-LLD (linear low density) having the structural formula

PE-LLD

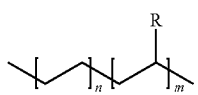

R=butyl, hexyl or octyl
n, m=integers, such that there is a ratio of 15-30 short chain branchings per 1000 C-atoms which may have an average particle size distribution of <150 µm.

The PE-LLD powder is processed on a laser sintering machine of the type P390 of the EOS company. The temperature of the process chamber is for example 5° C. below the melting point of the PE-LLD powder.

After the laser sinter process is finished, the cooling rate of the process chamber at 40° C. is controlled such that the cooling rate shows a maximum average of 0.2° C./min.

Example 5 (According to the Invention)

A powder producible from structurally modified polyethylene PE-HD (high density) having the structural formula

PE-HD

R=methyl
n, m=integers, such that there is a ratio of 15-30 short chain branchings per 1000 C-atoms which may have an average particle size distribution of <150 µm.

The PE-HD powder is processed on a laser sintering machine of the type P390 of the EOS company. The temperature of the process chamber is for example 5° C. below the melting point of the PE-HD powder.

After the laser sinter process is finished, the cooling rate of the process chamber at 40° C. is controlled such that the cooling rate shows a maximum average of 0.2° C./min.

Example 6 (According to the Invention)

A thermally treated PEKK powder (type PEKK-C, purchased from the company OPM, Enfield, Conn., USA) with a ratio of repeating units respectively containing at least one 1,4-phenylene unit to repeating units containing respectively at least one 1,3-phenylene unit, of 80:20, a melting point of 367° C. as well as a mean particle size $d_{50}$=55 µm was processed on a laser sintering machine of the type P700 that was modified by EOS for high temperature applications. The temperature of the process chamber was 343° C. The cooling rate showed a maximum average of 0.3 K/min.

The laser-sintered parts averagely had the following properties:
density: 1.246 g/cm$^3$
tensile strength (ISO 527-2):

| | |
|---|---|
| Young's modulus: | 4200 MPa |
| tensile strength: | 39 MPa |
| elongation at break: | 1.0% |

Example 7 (According to the Invention)

A thermally treated PEKK powder (Typ PEKK-SP, purchased from the company OPM, Enfield, Conn., USA) with a ratio of repeating units, respectively containing at least one 1,4-phenylene unit to repeating units respectively containing at least one 1,3-phenylene unit of 60:40, a melting point of 297° C. as well as a mean particle size $d_{50}$=60 µm was processed on a laser sintering machine of the type P700 that was modified by EOS for high temperature applications. The temperature of the process chamber was 286° C. The average cooling rate between 286-250° C. was higher than 0.3 K/min. Between 250° C. and $T_g$, it was defined by the natural heat loss.

The laser-sintered parts averagely had the following properties:
density: 1.285 g/cm³
tensile strength (ISO 527-2):

| | |
|---|---|
| Young's modulus: | 3900 MPa |
| tensile strength: | 69 MPa |
| elongation at break: | 1.9% |

The invention claimed is:

1. A process for manufacturing a three-dimensional object from a powder by selective sintering by means of electromagnetic radiation, the process comprising:
 (a) providing a powder of a sinterable polymer consisting of divalent units and/or monovalent units or a sinterable copolymer consisting of divalent units and/or monovalent units in the backbone chain, wherein the divalent units and/or monovalent units in the backbone chain are respectively formed from divalent monomers and/or monovalent monomers, and wherein said polymer or copolymer has at least one of the following structural characteristics:
  (i) at least one divalent linking group G in the backbone chain of the polymer or copolymer, wherein G has at least one side chain or substituent S and the bond linking portions to the backbone chain of the polymer in which the side chain or the substituent does not represent a polymer backbone chain, provided that in case of the use of polyaryletherketones (PAEK) the linking group is an aromatic structural unit in the backbone chain of the polymer or copolymer;
  (ii) modification of at least one end group of the backbone chain of the polymer or copolymer;
  (iii) at least one bulky group in the backbone chain of the polymer or copolymer, provided that in case of the use of polyaryletherketones (PAEK) the bulky group is not selected from the group consisting of phenylene, biphenylene, naphthalene and $CH_2$- or isopropylidene-linked aromatics; and
  (iv) at least one aromatic group non-linearly linking the backbone chain; and
 (b) selectively sintering the powder to form the three-dimensional object.

2. The process according to claim 1, further comprising solidifying successive layers of the object to be formed from the powder at positions corresponding to the cross section of the object; and/or providing the electromagnetic radiation by a laser.

3. The process according to claim 1, after the sintering step, further comprising cooling the object in a predefined and/or controlled cooling step.

4. The process according to claim 1, wherein the polymer or copolymer has at least one of the characteristics selected from the group of:
 a melting point $T_m$ in a range of 100° C. to 450° C.;
 a glass transition temperature $T_G$ in a range of 50 to 300° C.;
 a number average $M_n$ of at least 10,000 or a weight average $M_w$ of at least 20,000; and
 a polymerization degree n of 10 to 10,000.

5. The process according to claim 1, wherein the polymer or copolymer has at least one aromatic group having at least one of the characteristics selected from the group of:
 the aromatic group is in the repeating unit of the backbone chain; and
 the aromatic group is selected from unsubstituted or substituted, monocyclic or polycyclic aromatic hydrocarbons.

6. The process according to claim 1, wherein the powder comprises a polymer or copolymer having structural characteristic (iv) and the non-linear linking aromatic group has at least one of characteristics selected from the group of:
 at least one non-linear linking aromatic group is contained in the repeating unit of the backbone chain; and
 the polymer or copolymer contains at least one additional, linear-linking aromatic group which is different from the non-linearly linking aromatic group and/or at least one branching group, in the backbone chain.

7. The process according to claim 1, wherein the powder comprises a polymer or copolymer having structural characteristic (i) and the branching group is an aliphatic hydrocarbon, an aromatic hydrocarbon or a heteroarene which has at least one substituent or one side chain, in case of the use of polyaryletherketones (PAEK), the branching group is an aromatic structural unit in the backbone chain of the polymer or copolymer.

8. The process according to claim 1, wherein the polymer or copolymer has structural characteristic (ii) and the end group of the backbone chain is modified by a terminal alkyl, alkoxy, ester and/or aryl group.

9. The process according to claim 1, wherein the polymer or copolymer has structural characteristic (iii) and the bulky group is an aromatic or non-aromatic group, wherein in case of the use of polyaryletherketones (PAEK), the bulky group is not selected from the group consisting of phenylene, biphenylene, naphthalene and $CH_2$- or isopropylidene-linked aromatics.

10. The process according to claim 1, wherein the polymer or copolymer is formed on the basis of polyamide (PA), polyaryletherketone (PAEK), polyarylethersulfone (PAES), polyester, polyether, polyolefines, polystyrene, polyphenylenesulfide, polyvinylidenefluoride, polyphenyleneoxide, polyimide or a block copolymer that comprises at least one of the aforementioned polymers.

11. The process according to claim 10, wherein the polymer is a polyaryletherketone (PAEK) formed on the basis of polyetheretherketone (PEEK), polyetherketoneketone (PEKK), polyetherketone (PEK), polyetheretherketoneketone (PEEKK), polyetherketoneetherketoneketone (PEKEKK), polyaryletheretheretherketone (PEEEK) or a copolymer comprising at least one of the aforementioned polymers.

12. The process according to claim 11, wherein the polyetherketoneketone (PEKK) polymer or copolymer comprises 1,4-phenylene as the linear-linking aromatic group and 1,3-phenylene as the non-linear linking aromatic group in the backbone chain of the polymer.

13. The process according to claim 11, wherein the polyetherketoneketone (PEKK) polymer or copolymer comprises 1,4-phenylene as the linear-linking aromatic group and 1,3-phenylene as the non-linear linking aromatic group in the backbone chain of the polymer, wherein the ratio of repeating units of 1,4-phenylene to repeating units of 1,3-phenylene is 90/10-10/90.

14. The process according to claim 11, wherein the polyetherketoneketone (PEKK) polymer or copolymer comprises 1,4-phenylene as the linear-linking aromatic group and 1,3-phenylene as the non-linear linking aromatic group in the backbone chain of the polymer, wherein the ratio of repeating units of 1,4-phenylene to repeating units of 1,3-phenylene is 70/30-10/90.

15. The process according to claim 11, wherein the polyetherketoneketone (PEKK) polymer or copolymer comprises 1,4-phenylene as the linear-linking aromatic group and 1,3-phenylene as the non-linear linking aromatic group in the backbone chain of the polymer, wherein the ratio of repeating units of 1,4-phenylene to repeating units of 1,3-phenylene is 60/40-10/90.

* * * * *